United States Patent [19]

Jodrey

[11] 4,222,813
[45] Sep. 16, 1980

[54] BOTTLE TRANSPORT SYSTEM
[75] Inventor: Robert M. Jodrey, Westboro, Mass.
[73] Assignee: Dennison Manufacturing Company, Framingham, Mass.
[21] Appl. No.: 5,417
[22] Filed: Jan. 22, 1979
[51] Int. Cl.² .............................................. B44C 1/00
[52] U.S. Cl. .................................. 156/540; 198/367; 198/447; 198/459
[58] Field of Search ......................... 156/366, 540–542; 198/372, 367, 434, 436–437, 447–448, 339, 459–461

[56] References Cited

U.S. PATENT DOCUMENTS

| | | | |
|---|---|---|---|
| 1,852,322 | 4/1932 | Loew | 198/447 |
| 3,693,776 | 9/1972 | Harrison | 198/448 |
| 3,771,648 | 11/1973 | Revuelta | 198/372 X |

FOREIGN PATENT DOCUMENTS 641326  11/1934  Fed. Rep. of Germany ........... 198/436

*Primary Examiner*—David A. Simmons
*Attorney, Agent, or Firm*—George E. Kersey

[57] ABSTRACT

Method and apparatus for handling bottles and the like in heat transfer labelling and similar applications with increased processing rates. Bottles are delivered on a single lane conveyor, through a preheating station, and then routed through various bottle handling stations which separate the bottles into two groups to be handled by separate labelling modules. The two groups of bottles are then recombined in a single lane for further processing. The bottle handling apparatus consists of a dividing station, a crossover station, and a combining station. A bottle loading gate may be included to control the rate of feed of bottles into the single lane input conveyor. The handling stations include gates, for controlling the spacing of bottles, and diverters, for guiding bottles into selected lanes. The user may activate the bottle handling stations to double the labelling rate, or deactivate the stations to label each bottle twice.

13 Claims, 20 Drawing Figures

BOTTLE TRANSPORT SYSTEM

BACKGROUND OF THE INVENTION

This invention is related to handling systems for bottles and other containers, and more particularly to a handling system for bottle labelling apparatus.

Heat transfer labelling systems have come into wide use over the past few years. Such systems essentially include a conveyor for feeding bottles, a turret for positioning the bottles one at a time at a labelling station, a feed mechanism for transporting labels supported on a backing strip to the labelling station, and means for pressing the label against the bottle as the bottle and label are moved together. Examples are shown in U.S. Pat. Nos. 2,981,432; 3,036,624; 3,064,714; 3,208,897; 3,231,448; 3,261,732; 3,313,667; 3,709,775; and 3,861,986.

One aspect of such decorating systems which is of great importance to the user is the apparatus employed for transporting the bottles to and away from the labelling sites, and pre- and post-labelling processing stations. Several factors should be considered in designing such pre- and post-labelling apparatus so as to afford economies to the user. It is preferable to create a system which accommodates bottles of different cross sectional shape (e.g. round and oval), by means of minor adjustments in a single production line. This requires versatility in terms of the number of sides of any given bottle which will be labelled, as typically an oval bottle is labelled on two sides while a round bottle receives only one label.

Another important criterion is that of the production rate of the decorating apparatus. It is desirable to provide decorating apparatus which will label containers at as high a speed as is possible consistent with the mechanical limitations of the label application apparatus, bearing in mind the number of labels which are to be applied to a given container.

Another design factor which is of great practical significance is that of the compactness of the decorating apparatus and the convenience of access to various areas of operation. This factor is particularly relevant to the advantageous design of the bottle transport systems, which may occupy extensive space and impede the operator's access to the labelling area.

SUMMARY OF THE INVENTION

In accomplishing the above and related objects, the bottle handling system of the invention provides a means of incorporating two or more labelling modules into a single production line, in such a manner that the system may be easily adjusted to label one or more side of a given bottle. In its basic embodiment, the bottle handling system includes an inbound conveyor with a dividing system, a transfer conveyor with a crossover system, and an outbound conveyor with a combining system.

In accordance with one embodiment of the invention, the various bottle handling stations comprise belt conveyors bordered by contoured guard rails, gates, and diverters. In accordance with a related aspect of the invention, the action of the gates and diverters is controlled by a timing signal from a first labelling module, which coordinates the bottle handling functions with the machine cycle of the labelling module. In a specific embodiment of the invention, the above timing signal is a pulse of air initiated by bottle-inflation control apparatus within the labelling module.

In accordance with another aspect of the invention, the bottle handling system optionally includes a bottle loading gate which controls the feed of bottles onto the single lane inbound conveyor. In a preferred embodiment, an escapement type loading gate comprises a star wheel with arms at two different heights, and high and low air cylinders with detaining rods.

In accordance with a further aspect of the invention, at the dividing station bottles are evenly spaced by a gate, and every other bottle is forced into a second lane by a diverter. Alternatively, the diverter is placed prior to the gate.

In accordance with yet another aspect of the invention, the combining station spaces bottles at complementary intervals by means of two gates timed 180° out of phase, and bottles from both lanes are alternately combined in a single lane. The converging means may be passive or active in nature. An advantageuos form of crossover station comprises a combining station followed by a diverter. Alternatively, the crossover station includes four gates and a reciprocating bottle pusher. In either form, the crossover station effects a transposition of bottle locations in two adjacent lanes.

In accordance with still another aspect, a gate may comprise a pivoting member with two detaining flanges, or may comprise one or two air cylinders with projecting gates. In a related aspect of the invention, a diverter may comprise either a pivoting guide rail or an air pusher.

In accordance with a further aspect of the invention, the user may activate and deactivate the dividing, crossover, and combining stations. In the simplest case of two labelling modules, with the bottle handling stations in their activated state, the dividing station separates the bottles to be labelled into two groups, and each labelling module applies a single label to bottles in one group. With the bottle handling stations inactive, each bottle is labelled twice, once at each labelling module.

The bottle handling apparatus of the invention allows the use of a minimal number of pre- and post-labelling stations, in that these functions are effected while the bottles are in a single lane. The incorporation of single input and output lanes facilitates integration of the decorating apparatus of the invention with previously installed bottle processing equipment.

BRIEF DESCRIPTION OF THE DRAWINGS

The above and additional aspects of the invention are further illustrated with reference to the detailed description which follows, taken in conjunction with the drawings in which.

DETAILED DESCRIPTION

Figure 1:
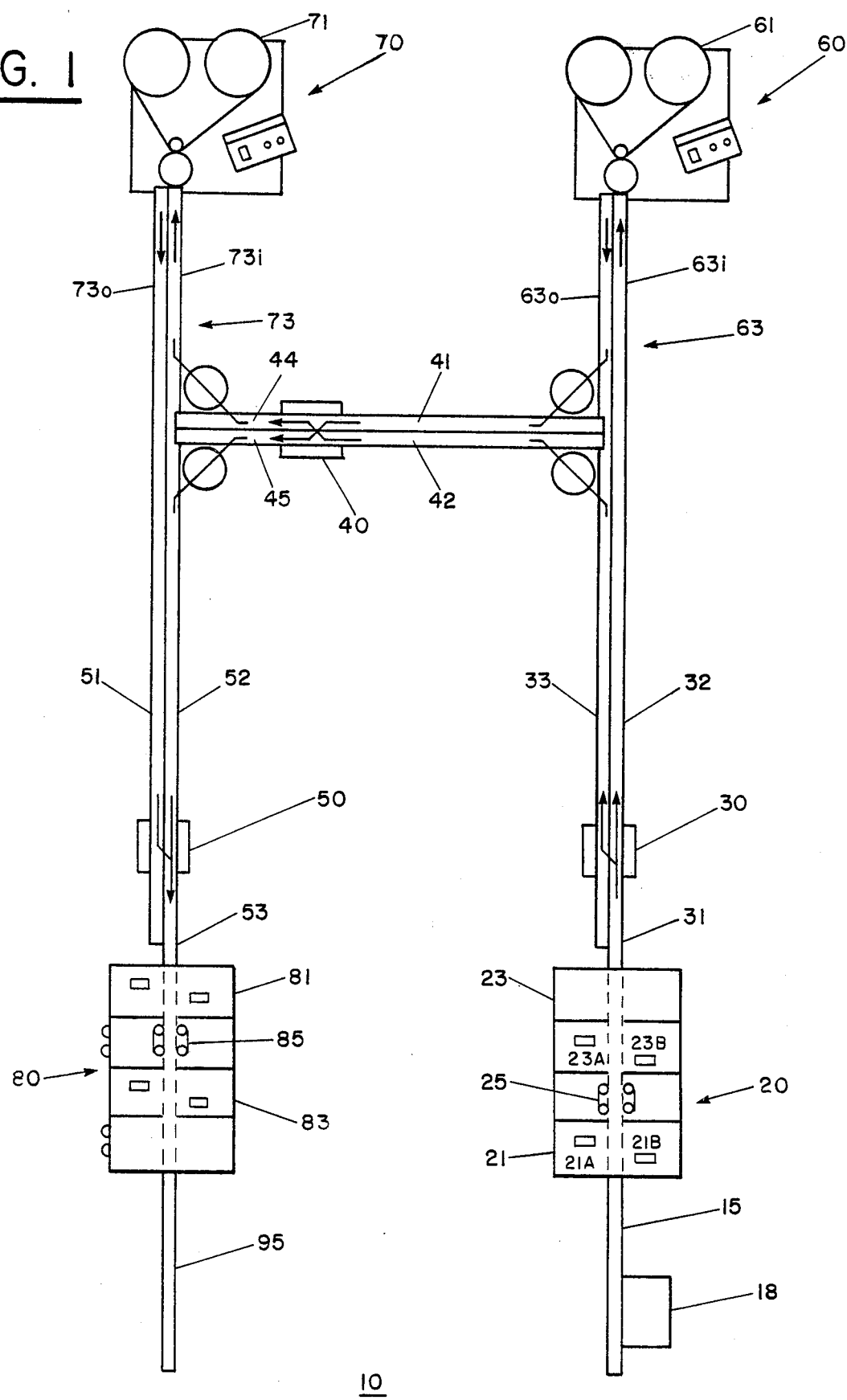
FIG. 1 is a plan view of bottle handling apparatus in accordance with a preferred embodiment of the invention.

Reference should now be had to FIGS. 1 through 12 for a detailed description of the bottle handling system of the invention. As shown in the plan view of FIG. 1, a preferred embodiment of the bottle handling system 10 includes an input conveyor 15, loading gate 18, preheating station 20, dividing station 30, crossover station 40, combining station 50, decorating stations 60 and 70, postheating station 80, and output conveyor 95. Input conveyor 15, output conveyor 95, and the various intermediate stages of the bottle transport illustratively comprise belt conveyors with guard rails. Input and output heating stations are of the type illustrated, for example, in U.S. Pat. No. 3,616,015. Preheating station 20, for example, includes flamers 21A and 21B, bottle turner 25, and flamers 23A and 23B.

Figure 2A:
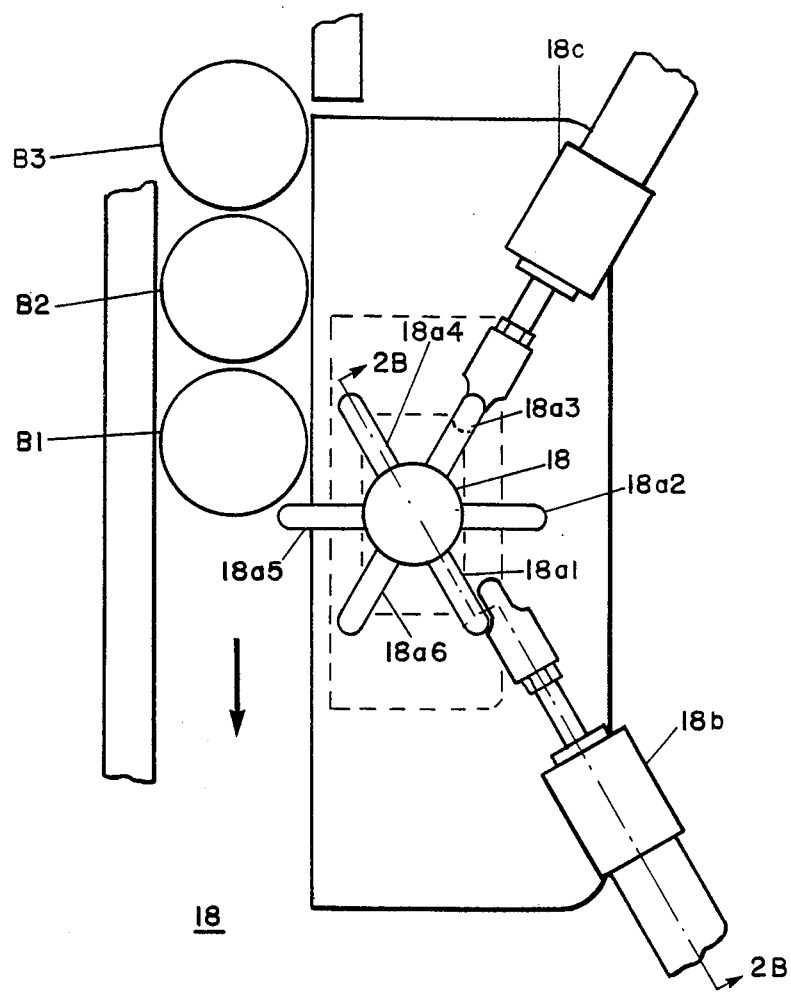
FIG. 2A is a top plan view of a bottle loading gate in accordance with a preferred embodiment of the invention.
Figure 2B:
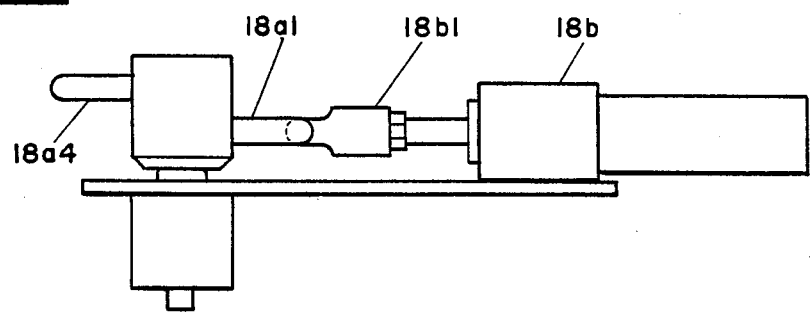
FIG. 2B is a sectional view of the "low" air cylinder, in a section 2B—2B of FIG. 2A.
Figure 2C:
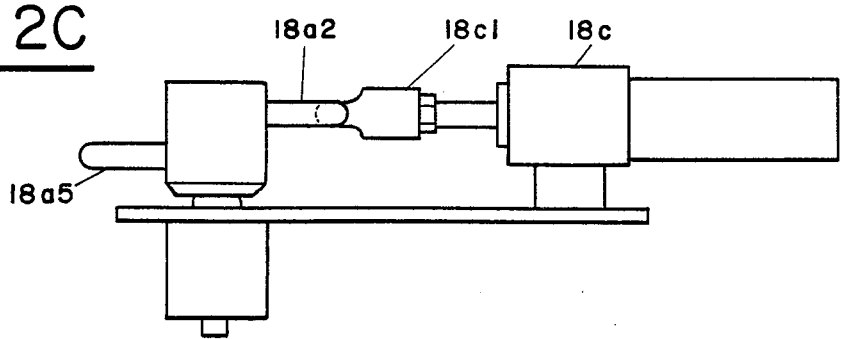
FIG. 2C is a sectional view of the "high" air cylinder of FIG. 2A at a subsequent time.

Loading gate 18 permits the passage of bottles onto input conveyor 15 at periodic intervals. A suitable form of loading gate is illustrated in FIGS. 2A through C. In the top plan view of FIG. 2A, loading gate 18 is an escapement type gate, which allows the passage of bottles one by one. Loading gate 18 consists of a star wheel 18A and air cylinders 18B and 18C. Star wheel 18A illustratively includes a series of six arms 18A1 through 18A6, which are alternatively arrayed at two different heights, corresponding to the heights of rods projected by air cylinder 18B and 18C. Thus, in the sectional view of FIG. 2B, air cylinder 18B has been activated to project rod 18B1, which detains an arm 18A1 of star wheel 18A. Star wheel 18A is subjected to counterclockwise torsion, so that the retraction of rod 18B1 will permit star wheel 18A to rotate until arm 18A2 is engaged by rod 18C1, as shown in FIG. 2C.

Rods 18B1 and 18C1 are alternatively projected and retracted in a complementary fashion, causing star wheel 18A to rotate in regular angular increments of 360°/number of arms. Every arm of star wheel 18A is of suitable form to prevent the passage of bottles on input conveyor 15. During rotation of star wheel 18A, a single bottle B1 is permitted to pass, while subsequent bottles B2, B3, etc. are urged by a backlog against the next arm of the star wheel.

Figure 3A:
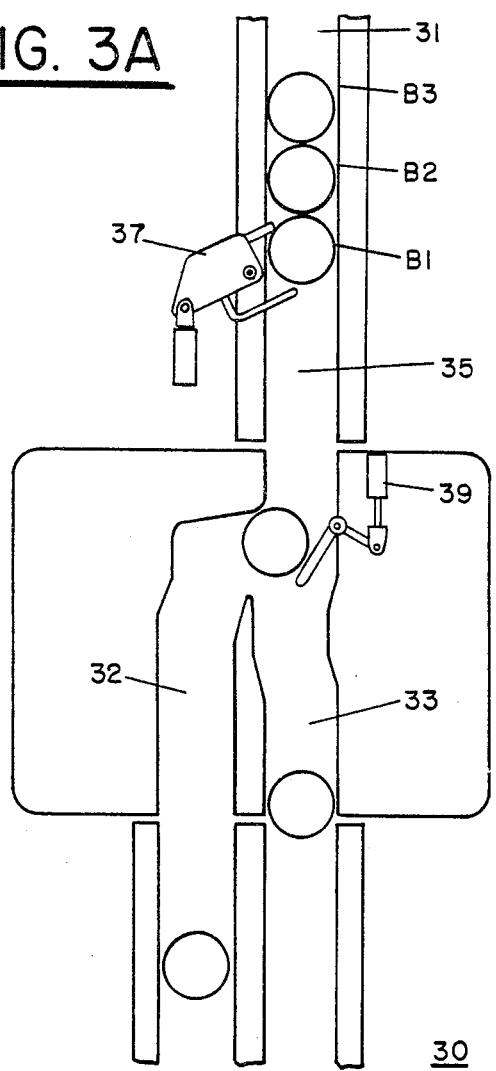
FIGS. 3A, 3B are plan views of a preferred form of dividing station, showing the two positions of the gate and diverter.

Bottle handling stations 30, 40, and 50 divide incoming bottles into two groups, with one group routed to a first decorating module 61 while the other group is routed to a second decorating module 71. These stations finally recombine the two groups into a single lane for further processing. An advantageous form for dividing staion 30 is shown in the plan views of FIGS. 3A and 3B. Bottles moving in direction A come in along a single lane 31, where they line up against gate 37, creating a backlog. As shown in FIG. 3A, gate 37 is a pivoting member of suitable length relative to the diameter of a bottle, with flanges at both ends for engaging a bottle surface. In a case other than that of a round bottle, the bottles have previously passed through orienting means (not shown), and gate 37 has a similar length to the dimension of the bottles along axis A. Gate 37 assumes one of two positions during the periodic operation of dividing station 30. In FIG. 3A, gate 37 is in an "impeding" position, with the forward end of the gate inserted into lane 31. While in this position bottles B1, B2, etc. move forward against the gate. During the other half of the cycle, gate 37 pivots so that its rearmost end is inserted into the lane 31, behind the forwardmost bottle lined up against the gate. Thus, in this "admitting" position, shown in FIG. 3B, gate 37 allows the passage of a single bottle.

Figure 3B:
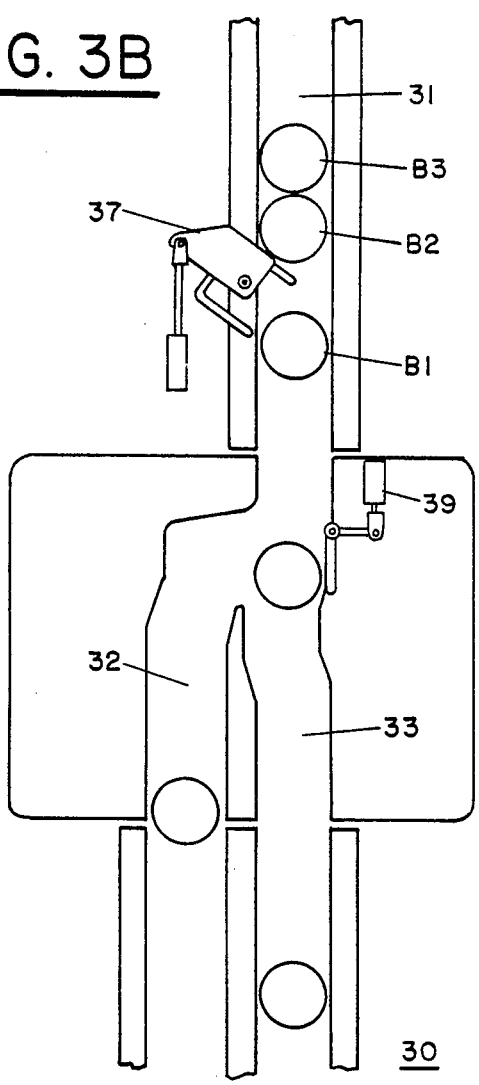

As a result of the periodic activity of gate 37, bottles are spaces at regular intervals, reflecting the period of gate 37 and the line speed of the conveyor. These bottles are then divided into two groups, one in lane 32 and the other in lane 33, by diverter 39. In the embodiment of FIGS. 3A and 3B, diverter 39 is a pivoting panel with two periodically alternating positions. In FIG. 3A, diverter 39 is in its activated position, causing bottle B1 to be deflected into lane 32. In FIG. 3B, diverter 39 is in a retracted position, allowing B2 to pass undeflected into lane 33. Diverter 39 is coordinated in its operation with the timing of gate 37, so that bottles are alternately routed into lanes 32 and 33.

Figure 4A:
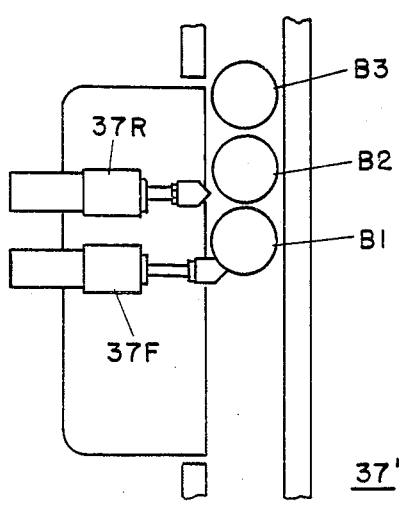
FIGS. 4A, 4B are plan views of an alternative gate embodiment for the bottle handling stations of the invention, shown in two different operational states.
Figure 4B:
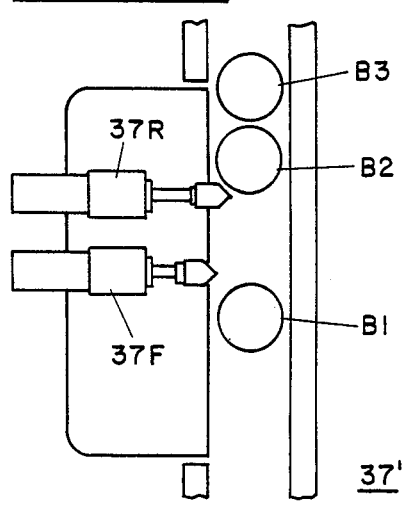
Figure 5:
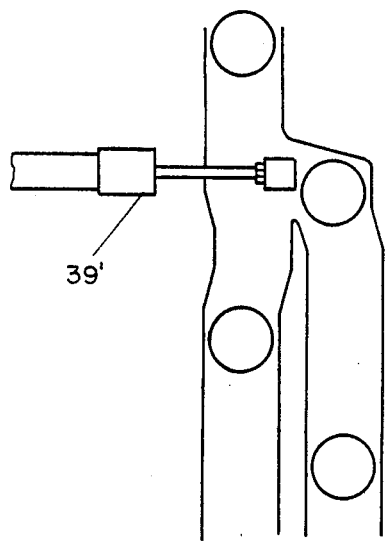
FIG. 5 is a plan view of an alternative form of diverter.

An alternative embodiment of gate 37 is shown in FIGS. 4A and 4B. Gate 37' comprises two air cylinder gates 37R and 37F, which are alternately projected into lane 31. In the "impeding" configuration of FIG. 4A, forward gate 37F is projected and rearward gate 37R is retracted, so that bottles line up against gate 37F. In the "admitting" configuration of FIG. 4B, gate 37R is projected between bottle B1 and the next bottle, and gate 37F retracts to allow the passage of bottle B1. An alternative form of diverter 39 is illustrated in FIG. 5. An air pusher 39' engages selected bottles and pushes them into lane 32. Air pusher 39' is activated to divert every other bottle.

Figure 6:
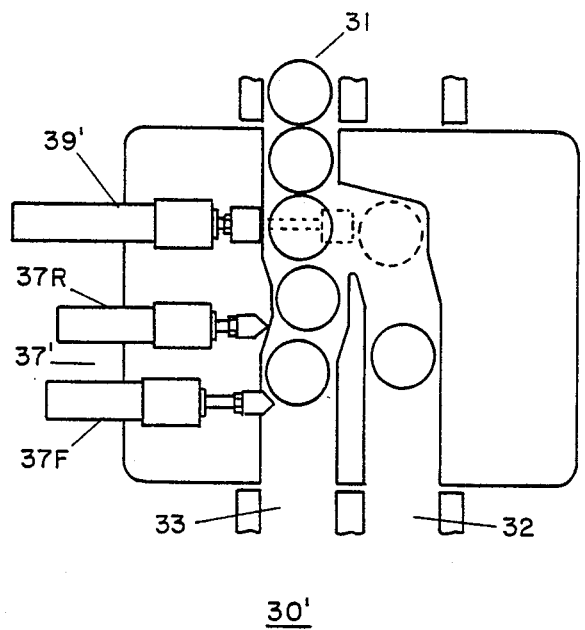
FIG. 6 is a plan view of an alternative form of dividing station.
Figure 7A:
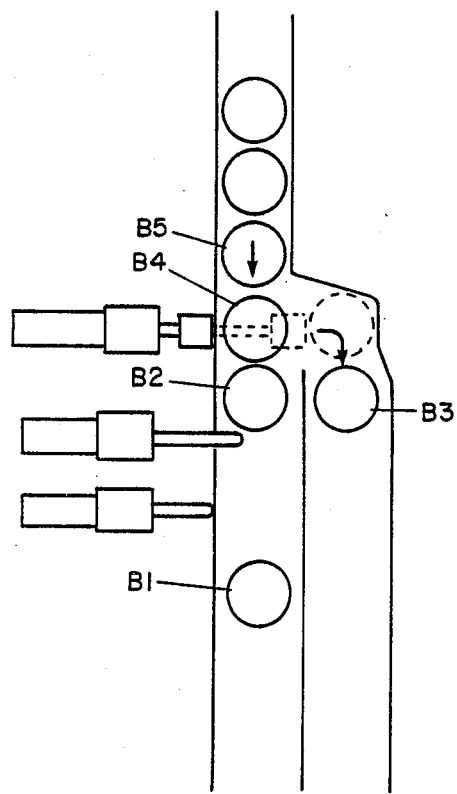
FIGS. 7A and 7B are schematic views of the two phases of the dividing station shown in FIG. 6.
Figure 7B:
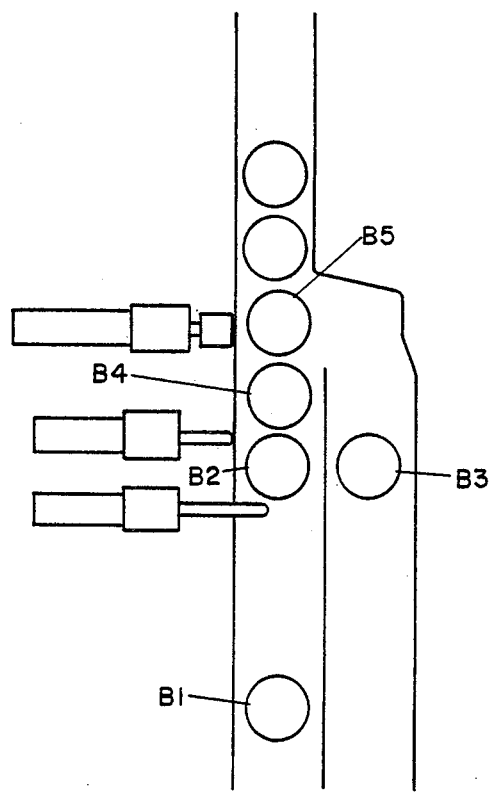

In an alternative embodiment 30' of divide station 30 illustrated in the plan view of FIG. 6, a diverter 39' acts upon selected bottles, while a gate 37' spaces the undiverted bottles at desired intervals. The operation of divide station 30' involves two phases, as shown in FIGS. 7A and 7B. During the first phase (FIG. 7A), forward gate 37F has opened, allowing the passage of the foremost bottle B1 in lane 33, while rear gate 37R impedes the progress of a second bottle B2. During this phase, pusher gate 39' forces a third bottle B3 into the second lane 32 and returns immediately to its original position. In this and other stations, the motion of the diverting air pusher is rapid relative to the belt speed of the underlying conveyors. During the second phase (FIG. 7B), forward gate 37F closes while reargate 37R opens, causing the backlog of bottles to move up to gate 37F while bottles B1 and B3 advance freely. As a result, bottles are evenly divided between lanes 32 and 33 and emerge from divide station 30' at complementary intervals.

Figure 8:
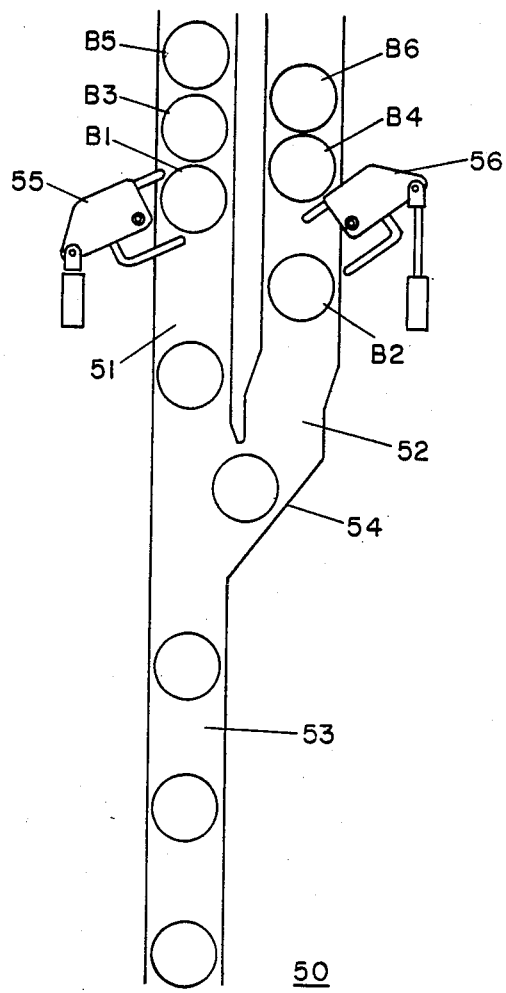
FIG. 8 is a plan view of a preferred combining station embodiment.

An advantageous realization of combining station 50 is depicted in the plan view of FIG. 8. Incoming bottles travelling in direction A are closely bunched in lanes 51 and 52. Gates 55 and 56 allow single bottles to pass in a carefully timed relationship, as discussed below. Gates 55 and 56 are identical in operation to gate 37 in FIGS. 3A, 3B or gate 37' in FIGS. 4A, 4B. These gates are timed 180° out of phase, so that when gate 55 is in the impeding position (as shown), gate 56 is in the admitting position, and vice versa. Thus, in FIG. 8, gate 56 has allowed bottle $B_2$ to pass while gate 55 is in position to release bottle $B_1$ half a cycle later. The result is that bottles are spaced in two lanes at complementary intervals. The bottles in lane 51 continue on course into lane 53, while the bottles in lane 52 are urged by diagonal guide rail 54, which acts as a converging device into lane 53. Thus a single line of equally spaced bottles is formed, alternately provided by lane 51 and lane 52. In an alternative embodiment of combining station 50, the converging means may comprise an air pusher, as in FIG. 5.

Figure 9:
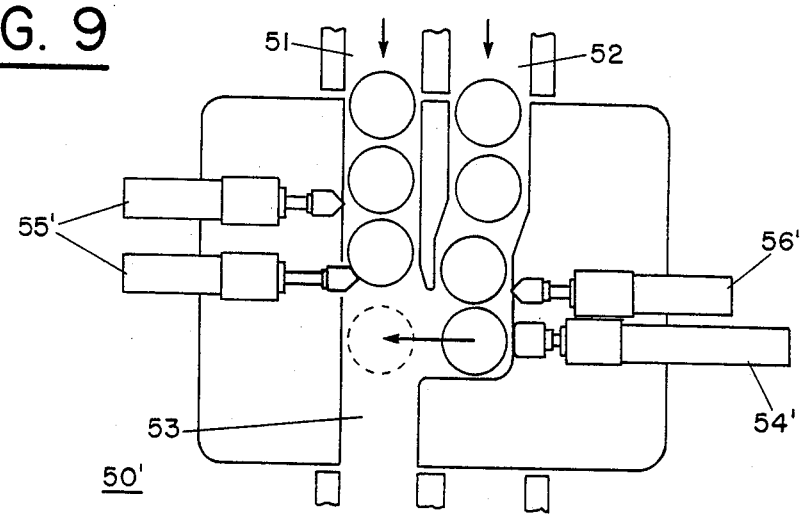
FIG. 9 is a plan view of an alternative combining station embodiment.

FIG. 9 shows an alternative combining station 50' using air pusher gates 55' and 56' and an air pusher converger 54'.

Figure 10:
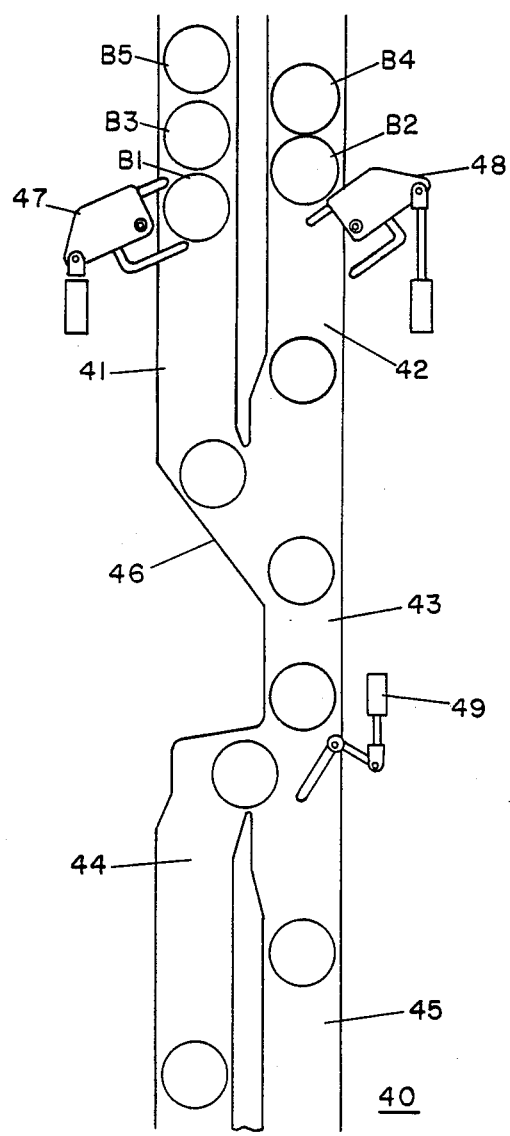
FIG. 10 is a plan view of a preferred crossover station embodiment.

FIG. 10 gives a plan view of an illustrative crossover station 40. In essence, this station comprises a combining station followed by a diverter. The components are timed in their operations so that bottles which start in lane 41 and are urged into lane 43 by converging means 46 are allowed to pass by diverter 49. Contrarily, bottles which start in lane 42 are deflected by diverter 49 into lane 44. The net result is that bottles are laterally transposed.

Figure 11:
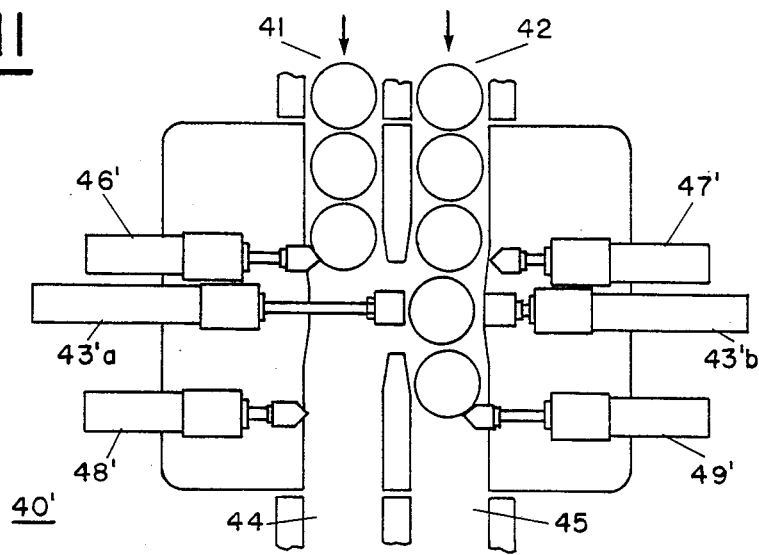
FIG. 11 is a plan view of an alternative crossover station.
Figure 12A:
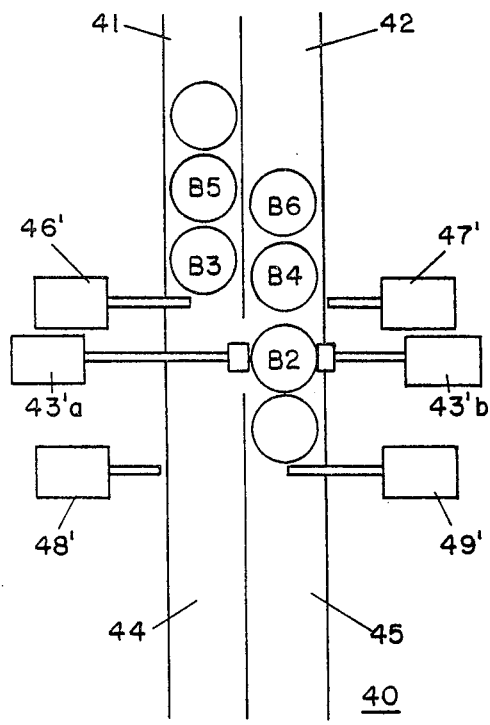
FIGS. 12A–12D are schematic views of successive states of the crossover station of FIG. 11.
Figure 12B:
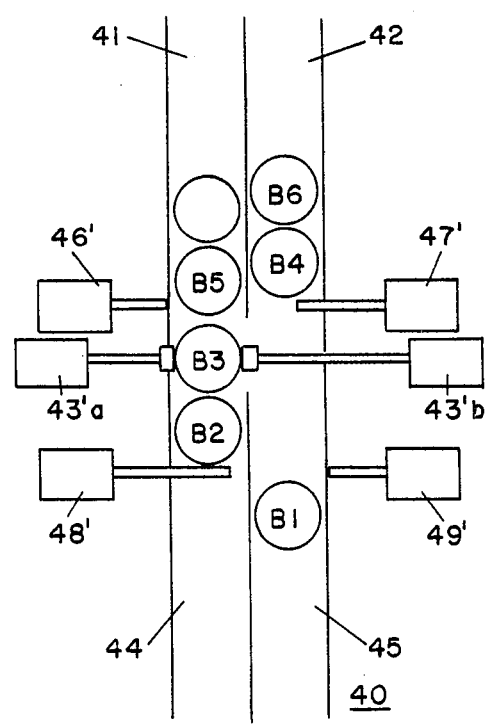
Figure 12C:
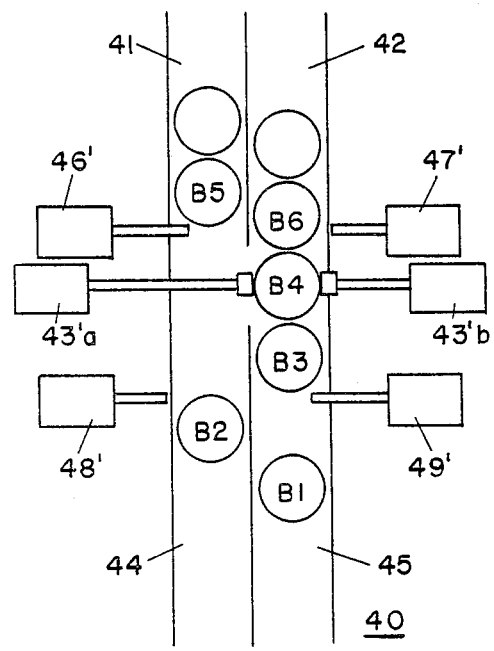
Figure 12D:
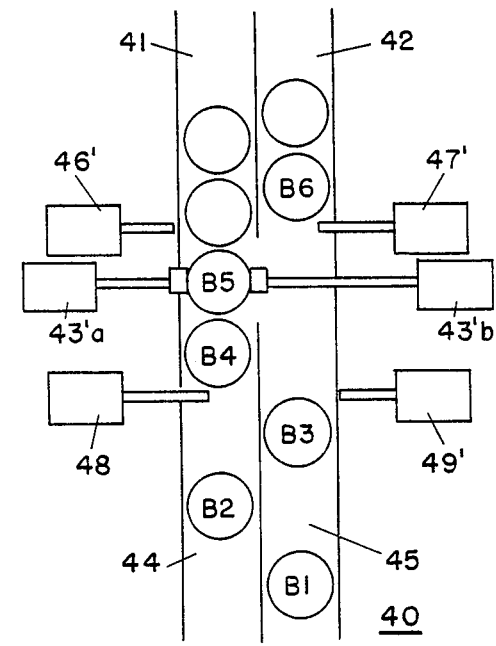

An alternative form of crossover station 40' is depicted in the plan view of FIG. 11. Crossover station 40' includes input lanes 41 and 42 and output lanes 44 and 45. Input gates 46' and 47', and output gates 48' and 49', illustratively comprise air cylinder gates. Bottle crossover is effected by reciprocating air pushers 43'A and 43'B, as illustrated schematically in FIGS. 12A through 12D. At an initial time shown in FIG. 12A, gates 46' and 49' are closed and gates 47' and 48' open, with pushers 43' to the right. This creates a backlog of bottles against gates 46' and 49'. In FIG. 12B, gates 46' through 49' have switched states, and pushers 43' have rapidly moved bottle B2 to the left. The backlog of bottles in lane 41 forces bottle B2 against gate 48' and bottle B3 between pushers 43'A and 43'B, while gate 49' releases bottle B1 into lane 45. In FIG. 12C, gates 46' to 49' again reverse states, and pushers 43' transfer bottle B3 to the right. The backlog of bottles in lane 42 forces bottle B3 against gate 49', and bottle B4 between pusher 43'A and 43'B. During this phase, bottle B2 (which originated in lane 42), is released into lane 44. The process of FIG. 12B is repeated in FIG. 12D, and bottle B3 (which originated in lane 41) is released into lane 45. As in the embodiment of FIG. 10, the result is that bottles are laterally transposed and emerge at complementary intervals.

Bottle handling stations 30, 40, and 50 all require a timing signal to control their operation. In loading gate 18 (FIG. 2A) this signal regulates the operation of air cylinders 18B and 18C. In dividing stations 30 and 30' (FIGS. 3A, 6) this signal is applied to gates 37 and 37' and diverters 39 and 39'. In crossover station 40 (FIG. 10), this signal is applied to gates 47 and 48 and to diverter 49. In alternative crossover station 40' (FIG. 11) the signal controls the operation of the various gates as well as reciprocating air pusher 43'. In combining station 50 (FIG. 8), the signal controls the operation of gates 55 and 56. In combining station 50' (FIG. 9) the signal additionally controls converging air pusher 54'. These signals are necessary to coordinate the operation of bottle handling devices within a given station, and to adjust the timing of the bottle transport mechanism to the speed of labelling at the labelling modules 60 and 70. One advantageous method of effectuating this signal utilizes apparatus within the labelling module for inserting a nozzle into a non-rigid botle and inflating the bottle to provide a firm labelling surface. This process is repeated once for each machine cycle of the labelling apparatus, and thus provides properly timed pulses of air. Suitable apparatus is disclosed, for example, in U.S. Pat. Nos. 3,064,714 and 3,208,897. These air pulses operate the various devices pneumatically by means of connecting air lines. Because of the necessity of providing a single timing signal, if labelling modules 61 and 71 do not necessarily operate at the same rate, the signal will be produced only by first labelling module 61. In some cases it will be necessary to halve the period of the timing pulse to control the operation of a given gate or diverter. For example, gate 37 in dividing station 30 should change positions twice during every labelling machine cycle.

The operation of the bottle transport system as a whole may be illustrated by further reference to FIG. 1. After bottles introduced by input conveyor 15 have passed through preheater station 20, they emerge on conveyor 31, and are separated into two groups in lanes 32 and 33, as discussed above. The bottles in lane 32 (group A) are fed by lane 63i to labelling module 61, and return on lane 63o. These bottles turn the corner onto lane 41, the change of direction to be effected by any suitable device well known to skilled practitioners of the art (for example, turning discs and guide rails). The bottles in group A are routed into lane 45 at crossover station 40, and turn the corner onto lane 52. At combining station 50, they are recombined with the labelled bottles of group B, which are transported as discussed below.

The bottles of group B are routed by dividing station 30 into lane 33, and turn the corner into lane 42. They are transferred at crossover station 40 into lane 44, and again turn the corner into lane 73i. After labelling at module 71, they return on lane 73o, and are recombined with the bottles of group A at combining station 50. The bottles, now in a single lane 53, pass through postflamer 80 and onto output conveyor 95, where they may be easily routed to further conventional processing apparatus. This arrangement of the bottle transport apparatus affords easy access of the operator to the labelling modules and other processing stations.

The labelling configuration discussed above, with all bottle handling stations activated, entails the division of incoming bottles into two groups with the application of a single label to each bottle. As a result, the limits of bottle handling rates, which are determined by the mechanical capabilities of the labelling modules, may be doubled by using two labelling modules in conjunction with the bottle handling apparatus of the invention. In the case of pre- and post-flamers, and similar processing devices which do not suffer such processing speed limitations, it is advantageous to incorporate these while the bottles are in a single lane, so that a single device may handle the entire workload.

If it is desirable to apply more than one label to each bottle, each single labelling station may be replaced with a plurality of labelling stations, as disclosed, for example, in U.S. Pat. No. 3,861,986. Alternatively, one may apply two labels to every bottle at the basic labelling rate in the configuration of FIG. 1 by deactivating the gates and diverters at various bottle handling stations. In this arrangement, all bottles will travel in a single lane to labelling module 61, then to labelling module 71.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims. In particular, while the bottle handling apparatus of the invention has been disclosed in the context of a transport system for bottle labelling apparatus, it is equally suitable for delivering bottles and similar objects to other types of processing apparatus.

I claim:

1. Apparatus for handling bottles and other objects, comprising:
    a single lane input conveyor, which transports objects sequentially;
    means for dividing objects transported on said input conveyor into first and second groups, and for further sequentially transporting objects in each group in a separate lane;
    crossover means having laterally adjacent first and second input lanes, for routing objects in the first input lane to a first output lane, and for routing objects in the second input lane to a second output lane, said output lanes being laterally adjacent, wherein the relative position of the first input lane with respect to the second input lane is the reverse of the relative position of the first output lane with respect to the second output lane;
    single lane conveyor means for transporting objects in the first group from the dividing means to a first processing station, and from said first processing station to the first input lane of the crossover means;
    single lane conveyor means for transporting objects in the second group from the dividing means to the second input lane of the crossover means;
    combining means having first and second infeed lanes, for combining objects on said infeed lanes in a single outfeed lane;
    single lane conveyor means for transporting objects in the second group from the second output lane of the crossover means to a second processing station, and from the second processing station to the second input lane of the combining means;
    single lane conveyor means for transporting objects in the first group from the first output lane of the crossover means to the first infeed lane of the combining means; and
    a single lane output conveyor, which transports objects sequentially from the outfeed lane of the combining means.

2. Apparatus as defined in claim 1 wherein the dividing, crossover, and combining means may be activated and deactivated, such that when these means are deactivated all objects introduced on said input conveyor remain in a single lane and pass through the first processing station, then through the second processing station, and emerge on the output conveyor.

3. Apparatus as defined in claim 1 wherein the first and second processing means operate periodically, and the spacing of objects emerging from the dividing, crossover, and combining means is regulated by timing signals representative of the period of operation of the first processing means.

4. Apparatus as defined in claim 3 further comprising input gating means for governing the spacing of objects in the single lane input conveyor in accordance with said timing signal.

5. Apparatus as defined in claim 4 wherein the input gating means comprises
    a rotatable gating cylinder located adjacent said single lane input conveyor;
    means for exerting a continuous torque on said gating cylinder, whereby the cylinder will rotate if unimpeded;
    a plurality of arms appended to the perimeter of said gating cylinder at regular angular intervals, each of which is projected into said input conveyor during a portion of the rotation of the gating cylinder so as to prevent the passage of objects on said input conveyor, said arms being alternately located at two different heights ("high" and "low") on said gating cylinder;
    "high" detaining means, which may be activated to engage a high arm and prevent the rotation of said gating cylinder, or deactivated to allow unimpeded rotation of the gating cylinder, said high detaining means being located so that when it engages one of said arms another arm is projected into said input conveyor;
    "low" detaining means, which may be activated to engage a "low" arm and prevent the rotation of said gating cylinder, or deactivated to allow unimpeded rotation of the gating cylinder, said low detaining means being located so that when it engages one of said arms another arm is projected into said input conveyor, wherein said high detaining means is activated when said low detaining means is deactivated, and deactivated when said low detaining means is activated, and
    a timing signal for regulating the activation and deactivation of said high and low detaining means.

6. Apparatus as defined in claim 1 wherein said dividing means comprises:
    gating means for allowing the passage of objects at evenly spaced intervals on a single conveyor lane;
    diverting means for selectively routing the evenly spaced objects to one of the two output lanes; and
    a timing signal for regulating the operation of said gating means and diverting means.

7. Apparatus as defined in claim 1 wherein the dividing means comprises:
    gating means for allowing the passage of objects at evenly spaced intervals on said first output lane;
    diverting means for selectively routing objects in a backlog behind said gating means into said second output lane; and
    a timing signal for regulating the operation of said gating means and diverting means.

8. Apparatus as defined in claim 1 wherein said combining means comprises:
    first and second gating means respectively located in said first and second infeed lanes for allowing the passage of objects at evenly spaced intervals within each lane, wherein the spacing of objects in said first infeed lane is complementary to the spacing of objects in said second infeed lane;

means for converging the objects in a single outfeed lane; and a timing signal for regulating the operation of the first and second gating means.

9. Apparatus as defined in claim 1 wherein the crossover means comprises:

first and second gating means respectively located in said first and second input lanes for allowing the passage of objects at evenly spaced intervals within each lane, wherein the spacing of objects in said first input lane is complementary to the spacing of objects in said second input lane;

means for converging the objects in an intermediate lane;

diverting means for selectively routing the objects in said intermediate lane to one of the two output lanes, wherein objects originating in the first input lane are routed to the first output lane, while objects originating in the second input lane are routed to the second output lane; and a timing signal for regulating the operation of the gating means and the diverting means.

10. Apparatus as defined in claim 1 wherein the crossover means comprises:

an intermediate zone into which objects are routed from said first and second input lanes and from which objects are routed to said first and second output lanes;

first and second input gating means respectively located in said first and second input lanes for releasing objects into said intermediate zone at complementary intervals;

reciprocating diverting means for routing objects in said intermediate zone which originate in said first input lane into said first output lane, and for routing objects in said intermediate zone which originate in said second input lane into said second output lane;

first and second output gating means respectively located in said first and second output lanes for allowing the passage of objects at evenly spaced intervals within each lane, wherein the spacing of objects in said first output lane is complementary to the spacing of objects in said second output lane; and a timing signal for regulating the operating of the gating means and the reciprocating diverting means.

11. Apparatus as defined in claim 1, for heat transfer labelling of bottles and other containers, wherein the first and second processing stations comprise devices for transferring labels to bottles under heat and pressure.

12. Apparatus as defined in claim 11 further comprising preheating and post-heating stations located respectively at said single lane input and output conveyors.

13. Apparatus for regulating the transport of bottles and other objects comprising:

a rotatable gating cylinder located adjacent to a conveyor;

means for exerting a continuous torque on said gating cylinder, whereby the cylinder will rotate if unimpeded;

a plurality of arms appended to the perimeter of said gating cylinder at regular angular intervals, each of which is projected into said conveyor during a portion of the rotation of the gating cylinder so as to prevent the passage of objects on said conveyor, said arms being alternately located at two different heights ("high" and "low") on said gating cylinder;

"high" detaining means, which may be activated to engage a high arm and prevent the rotation of said gating cylinder, or deactivated to allow unimpeded rotation of the gating cylinder, said high detaining means being located so that when it engages one of said arms another arm is projected into said input conveyor;

"low" detaining means, which may be activated to engage a "low" arm and prevent the rotation of said gating cylinder, or deactivated to allow unimpeded rotation of the gating cylinder, said low detaining means being located so that when it engages one of said arms another arm is projected into said input conveyor, wherein said high detaining means is activated when said low detaining means is deactivated, and deactivated when said low detaining means in activated, and a timing signal for regulating the activation and deactivation of said high and low detaining means.

* * * * *